United States Patent [19]

Leshik et al.

[11] Patent Number: 4,464,403

[45] Date of Patent: Aug. 7, 1984

[54] INSTANT PUDDING COMPOSITION CONTAINING COCOA AND PROCESS

[75] Inventors: Richard R. Leshik, Ewing; Bala S. Iyer, Mercerville, both of N.J.; John R. Carpenter, Hershey, Pa.

[73] Assignee: General Foods Corporation, White Plains, N.Y.

[21] Appl. No.: 463,466

[22] Filed: Feb. 3, 1983

[51] Int. Cl.³ .................... A23L 1/187; A23L 1/195; A23L 1/234
[52] U.S. Cl. .................................. 426/271; 426/579; 426/631; 426/584
[58] Field of Search ............... 426/579, 584, 631, 271

[56] References Cited

U.S. PATENT DOCUMENTS

| | | | |
|---|---|---|---|
| 2,607,692 | 8/1952 | Kennedy | 426/579 |
| 2,884,346 | 4/1959 | Korth | 426/271 |
| 2,927,861 | 3/1960 | Charie et al. | 426/579 |
| 4,338,350 | 7/1982 | Chen et al. | 426/579 |

Primary Examiner—Jeanette M. Hunter
Attorney, Agent, or Firm—Thomas R. Savoie; Thomas A. Marcoux; Daniel J. Donovan

[57] ABSTRACT

A source of a traditional problem in instant pudding compositions containing cocoa was discovered. This disclosure describes a means of resolving the problem by a process which comprises the step of reducing the cocoa's magnesium activity.

10 Claims, No Drawings

INSTANT PUDDING COMPOSITION CONTAINING COCOA AND PROCESS

BACKGROUND OF THE INVENTION

The present invention relates to stabilized cocoa flavored and colored instant pudding products and method of making the same. More particularly, the present invention is directed to an instant pudding composition containing cocoa which maintains a good texture.

Typically, instant puddings are prepared by combining a dry mix with a specified volume of milk. The dry mix contains a milk protein coagulant which interacts with the milk proteins. Somewhat arbitarily, the interaction between the coagulant and the milk protein can be viewed as a two step process: on step wherein the viscosity of the milk-dry mix combination is progressively increasing, and a second step wherein the composition sets. The most commonly used milk protein coagulents in instant pudding mixes are the tetraalkali pyrophosphates.

While these dry mixes have worked well with most flavors and colors, cocoa has always presented a problem. When a standard, dry, instant pudding mix formulation includes cocoa, the viscosity increase after the addition of milk is at a substantially slower rate than observed for the same formultion without cocoa. Furthermore, the end point, a good set, is not acheived. To overcome these problems, more starch or other viscosity building agents are included in the mix. However, increasing the amount of viscosity building agent increases the cost of the dry mix and may unbalance the flavor of the pudding made from this dry mix. Thus, it is an object of this invention to produce an instant pudding mix containing cocoa which develops both a good viscosity and set while using less viscosity building agent than has been used in the art.

SUMMARY OF THE INVENTION

Briefly, the above and other features of the present invention are achieved by combining a magnesium chelating agent with the ionic magnesium within the cocoa prior to adding to cocoa containing dry instant pudding mix to milk. A preferred means of chelating the ionic magnesium within the cocoa is to disperse the cocoa and the magnesium chelating agent, to dry the dispersion, and to blend the dried dispersion with the other dry ingredients so as to formulate a dry, cocoa containing, instant pudding mix.

DETAILED DESCRIPTION OF THE INVENTION

In investigating the low viscosity and poor set of instant puddings containing cocoa, it was found that cocoa contains a significant amount of magnesium activity. Moreover, a direct relationship between the amount of magnesium activity in the dry mix—either in the cocoa or otherwise—and the viscosity and set of the pudding made from this mix was observed. Thereafter, it was discovered that reducing the cocoa's magnesium activity—either by removing the ionic magnesium from the cocoa or by rendering the magnesium chemically inert—modified the cocoa so that the cocoa no longer inhibited the development of the proper viscosity and set in the instant pudding.

While the ionic magnesium could be removed from a cocoa dispersion by precipitation—chemical or electrical—or by contact with either an ion exchange or an affinity resin, the preferred means of practicing the instant invention is to complex or chelate the ionic magnesium in the cocoa dispersion so as to render the magnesium chemically inert. While many divalent cation ligands will function as the complexing or chelating agent, it is preferred that the ligand be approved for food usage. It is further preferred that the complex formed between magnesium and the ligand have an association constant greater than about 1 when the pH is between about 5 and about 9. It is even further preferred that the association constant for the magnesium-ligand complex be greater than about 10 within this pH range, and it is still further preferred that the association constant be greater than about 100 within this pH range. Notwithstanding the association constant within the pH range between about 5 and about 9, it is more preferred that the ligand-magnesium complex have a association constant greater than about 10 within the pH range between about 6.5 and about 8. However, it is still further preferred that the association constant be greater than about 100 within the pH range between about 6.5 and about 8.

Phosphorous oxyacid salts that are essentially free of magnesium and have the desired magnesium association constant are useful chelating agents in this invention. Monovalent cation salts of phosphorous oxyacids are especially desirable, such as an alkali pyrophosphate including: tetrasodium pyrophosphate, tetrapotassium pyrophosphate, trisodium potassium pyrophosphate, tripotassium sodium pyrophosphate, disodium dipotassium pyrophosphate and combinations thereof.

The pudding mix of this invention contains levels of the various ingredients as are common in the art, for example: sugar at 25 to 85% (preferably 50 to 80%); pregelatinized starch at 5 to 25% (preferably 10 to 20%); setting agents at 1-5% (preferably 2-4%); flavor at 0 to 3%; and optionally fat at 0 to 20%, all percents being by weight of the total composition. The setting agents are preferably an alkali pyrophosphate and an alkali orthophosphate.

The instant pudding is prepared by mixing the pudding mix with milk and allowing the mixture to set. For example, about 100 grams of the pudding mix is mixed with 2 cups (473 ml) of milk.

EXAMPLE 1

Cocoa powder, 8.5 gm and 0.3 gm of tetrasodium pyrophosphate were dispersed in 60 ml of distilled water. After 5 minutes of mixing, the suspension was filtered and the material retained during filtration was dried. This dried material was then blended with 106 gm of a vanilla Jell-O ® Instant Pudding mix. Once blended, the mix was mixed with 2 cups (473 ml) of milk and allowed to set.

EXAMPLE 2

Cocoa powder, 8.5 gm were dispersed in 60 ml of water, however, no magnesium chelating agent was used. This suspension, after 5 minutes of mixing, was filtered and the filter cake dried. The dried filter cake was then blended with 106 gm of a vanilla Jell-O ® Instant Pudding mix. Once blended, the mix was mixed with 2 cups (473 ml) of milk and allowed to set.

EXAMPLE 3

Cocoa powder, 8.5 gm were blended with 106 gm of a vanilla Jell-O ® Instant Pudding mix. Once blended, the mix was mixed with 2 cups (473 ml) of milk and allowed to set.

EXAMPLE 4

A vanilla Jell-O ® Instant Pudding mix, 106 gm was mixed with 2 cups (473 ml) of milk and allowed to set.

The viscosities of set Example 1–4 puddings on a rotoviscometer, are given in Table 1.

TABLE 1

| Sample | Viscosity |
|---|---|
| Example 1 | 234 |
| Example 2 | 195 |
| Example 3 | 170 |
| Example 4 | 255 |

EXAMPLE 5

Two cups of milk (473 ml) were combined with 108 mg of a cocoaless chocolate instant pudding mix. This was mixed and allowed to set.

EXAMPLE 6

Cocoa powder, 8.5 gm, was suspended in 50 ml of water. The suspension was filtered and the filter cake was resuspended in another 50 ml aliquot of water. The second suspension was also filtered, and the resulting filter cake was suspended in a third, 50 ml aliquot of water. The third filter cake was combined with 108 gm of the Example 5 pudding mix and 2 cups (473 ml) of milk. This combination was mixed and allowed to set.

EXAMPLE 7

The three filtrates from Example 6 were combined and then evaporated in an oven to form a paste. The paste was combined with 108 gm of the Example 5 instant pudding mix and 2 cups (473 ml) of milk. This combination was mixed and allowed to set.

EXAMPLE 8

Cocoa powder, 8.5 gm, was blended with 108 gm of the Example 5 pudding mix. This blend was combined with 2 cups (473 ml) of milk, mixed well, and allowed to set.

The viscosities of the set puddings from Examples 5–8 taken from a rotoviscometer, are given in Table 2.

TABLE 2

| Sample | Viscosity |
|---|---|
| Example 5 | 280 |
| Example 6 | 267* |
| Example 7 | 242* |
| Example 8 | 245 |

*based on 3 samples.

What is claimed:

1. A process for making an improved instant pudding mix containing cocoa comprising the following steps in the stated order:
   a. reducing the magnesium activity of said cocoa;
   b. combining and blending said reduced magnesium activity cocoa with sugar, pregelatinized starch, and a setting agent; and
   c. packaging said combination.

2. A process according to claim 1 which further comprises the steps of:
   a. forming an aqueous slurry of said cocoa; and
   b. drying said aqueous slurry after the magnesium activity of said cocoa has been reduced.

3. A process according to claim 1 wherein the magnesium activity of the cocoa is reduced by adding a magnesium chelating agent to said cocoa.

4. A process according to claim 3 wherein said magnesium chelating agent is an essentially magnesium free, phosphorous oxyacid salt.

5. A process according to claim 4 wherein the essentially magnesium free, phosphorous oxyacid salt is an alkali pyrophosphate.

6. A process according to claim 5 wherein the alkali pyrophosphate is tetrasodium pyrophosphate.

7. A process according to claim 1 wherein the magnesium activity of the cocoa is reduced by electrochemical precipitation.

8. A process according to claim 1 wherein the magnesium activity of the cocoa is reduced by an essentially magnesium free, aqueous wash.

9. A process according to claim 1 wherein the magnesium activity of the cocoa is reduced by an exchange of the cocoa's magnesium for non-magnesium cations.

10. A process according to claim 1 wherein the magnesium activity of the cocoa is reduced by chemical precipitation of the magnesium.

* * * * *